United States Patent
Nagoshi et al.

(10) Patent No.: US 12,353,199 B2
(45) Date of Patent: Jul. 8, 2025

(54) COMMUNICATION APPARATUS AND TEMPERATURE MONITORING METHOD

(71) Applicant: Nippon Telegraph and Telephone Corporation, Tokyo (JP)

(72) Inventors: Haruka Nagoshi, Musashino (JP); Toshinori Hanano, Musashino (JP); Shun Morishima, Musashino (JP); Kenta Ito, Musashino (JP); Masayoshi Sekiguchi, Musashino (JP); Takayoshi Tashiro, Musashino (JP); Satoshi Shimazu, Musashino (JP); Tomoaki Yoshida, Musashino (JP); Manabu Kubota, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 492 days.

(21) Appl. No.: 17/792,293

(22) PCT Filed: Jan. 17, 2020

(86) PCT No.: PCT/JP2020/001474
§ 371 (c)(1),
(2) Date: Jul. 12, 2022

(87) PCT Pub. No.: WO2021/144950
PCT Pub. Date: Jul. 22, 2021

(65) Prior Publication Data
US 2023/0109949 A1  Apr. 13, 2023

(51) Int. Cl.
*H02H 1/00* (2006.01)
*G05B 23/02* (2006.01)
*H02H 5/04* (2006.01)

(52) U.S. Cl.
CPC ....... *G05B 23/0224* (2013.01); *H02H 1/0007* (2013.01); *H02H 5/04* (2013.01); *G05B 2223/02* (2018.08)

(58) Field of Classification Search
CPC ............ G05B 23/0224; G05B 2223/02; G05B 23/0235; H02H 1/0007; H02H 5/04; H04B 10/00; H04L 12/44
See application file for complete search history.

(56) References Cited

U.S. PATENT DOCUMENTS 5,898,557 A * 4/1999 Baba ....................... H03K 17/18
361/103
6,108,183 A * 8/2000 Beene ..................... H04M 3/18
361/103
(Continued)

FOREIGN PATENT DOCUMENTS

JP   2003273795   9/2003
JP   2005211395   8/2005
(Continued)

OTHER PUBLICATIONS

NDK Inc., "Product history Temperature abnormality alarm device," nihondensi.co, retrieved on Jun. 27, 2019, retrieved from URL <http://www.nihondensi.co.jp/product/jta700.html>, 3 pages (with English Translation).

*Primary Examiner* — Christopher E. Everett
(74) *Attorney, Agent, or Firm* — Fish & Richardson P.C.

(57) ABSTRACT

A communication apparatus includes a communication unit, a power supply unit, a temperature monitoring unit, and a control unit. The communication unit communicates with an additional apparatus. The power supply unit supplies power to components mounted in the communication apparatus. The temperature monitoring unit monitors a temperature in the communication apparatus to detect presence or absence of a temperature abnormality. In a case where the tempera-
(Continued)

ture monitoring unit detects the temperature abnormality, the control unit performs power supply stop processing of stopping the power supply from the power supply unit to at least some of the components. Furthermore, the control unit stops or decreases communication of the communication unit in a case where the temperature monitoring unit detects the temperature abnormality.

5 Claims, 11 Drawing Sheets

(56) References Cited

U.S. PATENT DOCUMENTS

2007/0253132 A1* 11/2007 Nakamura ............. G01K 3/005
361/103
2021/0215546 A1* 7/2021 Ikeuchi ................... H02H 5/04

FOREIGN PATENT DOCUMENTS

| JP | 2011109526 | 6/2011 |
| JP | 2018026746 | 2/2018 |

* cited by examiner

COMMUNICATION APPARATUS AND TEMPERATURE MONITORING METHOD

CROSS-REFERENCE TO RELATED APPLICATIONS

This application is a National Stage application under 35 U.S.C. § 371 of International Application No. PCT/JP2020/001474, having an International Filing Date of Jan. 17, 2020, the disclosure of which is considered part of the disclosure of this application, and is incorporated in its entirety into this application.

TECHNICAL FIELD

The present invention relates to a communication apparatus and a temperature monitoring method.

BACKGROUND ART

A passive optical network (PON) is used for connecting to a backbone network from a terminal apparatus of a user. The PON includes an optical network unit (ONU) installed in a house of a user, and an optical line terminal (OLT) installed in an exchange building. The OLT is connected to a plurality of the ONUs by an optical fiber network.

FIG. 11 is a functional block diagram illustrating a configuration of an ONU 90 of the related art. The ONU 90 is a 10 Gigabit Ethernet (trade name) passive optical network (10G-EPON) ONU. A direction from a terminal apparatus 91 of a user to an OLT 92 is an uplink direction, and a direction from the OLT 92 to the terminal apparatus 91 of the user is a downlink direction.

The ONU 90 includes a control unit 901, an optical transmission and reception unit 903, a power supply unit 904, and a cooler (FAN) 905. Solid arrows represent communication signals. The control unit 901 controls each unit of the ONU 90. The control unit 901 includes a user/network interface (UNI) 902. The UNI 902 transmits and receives data to and from the terminal apparatus 91. The optical transmission and reception unit 903 converts an uplink electrical signal input from the UNI 902 into an optical signal to output the optical signal to the OLT 92, and converts a downlink optical signal input from the OLT 92 into an electrical signal to output the electrical signal to the UNI 902. The power supply unit 904 supplies power received from a power source to each unit of the ONU 90. The FAN 905 cools components in the ONU 90.

The components mounted in the ONU 90 may generate heat when the components receives power from the power supply unit 904 and operate. As a countermeasure against an increase in temperature of the components, heat is dissipated by increasing a size of a housing, and cooling is performed by mounting the FAN 905. On the other hand, there is a temperature abnormality alarm device that outputs an alarm for a temperature abnormality (for example, see NPL 1).

CITATION LIST

Non Patent Literature

NPL 1: "Product history, temperature abnormality alarm device", [online], NDK Inc., [Retrieval on Jun. 27, 2019], internet (URL: http://www.nihondensi.co.jp/product/jta700.html)

SUMMARY OF THE INVENTION

Technical Problem

As described above, the temperature of the ONU may be high due to the heat generation of the mounted components. It is conceivable to detect that the ONU is high in temperature by using a temperature abnormality alarm device. However, the temperature alarm device does not eliminate a temperature abnormality of a communication apparatus such as the ONU. In the related art, the measure of increasing an apparatus size has been taken in order to cool the ONU. Furthermore, it is also possible to take the measure of installing the FAN as illustrated in FIG. 11. However, taking such measures causes the apparatus size to increase. It may be difficult to ensure an installation place of a large ONU in the house of the user.

In view of the aforementioned circumstances, an object of the present invention is to provide a communication apparatus and a temperature monitoring method that are capable of eliminating a temperature abnormality caused in the communication apparatus.

Means for Solving the Problem

According to an aspect of the present invention, a communication apparatus includes:
  a communication unit configured to communicate with an additional apparatus;
  a power supply unit configured to supply power to components mounted in the communication apparatus;
  a temperature monitoring unit configured to monitor a temperature of the communication apparatus to detect presence or absence of a temperature abnormality; and
  a control unit configured to perform power supply stop processing of stopping power supply from the power supply unit to at least some of the components in a case where the temperature monitoring unit detects the temperature abnormality.

According to another aspect of the present invention, a communication apparatus includes:
  a communication unit configured to communicate with an additional apparatus;
  a power supply unit configured to supply power to components mounted in the communication apparatus;
  a temperature monitoring unit configured to monitor a temperature of the communication apparatus to detect presence or absence of a temperature abnormality; and
  a control unit configured to stop or decrease communication of the communication unit in a case where the temperature monitoring unit detects the temperature abnormality.

According to still another aspect of the present invention, a temperature monitoring method in a communication apparatus includes:
  communicating, by a communication unit, with an additional apparatus;
  monitoring a temperature of the communication apparatus to detect presence or absence of a temperature abnormality; and
  performing power supply stop processing of stopping power supply from a power supply unit that supplies power to components mounted in the communication apparatus to at least some of the components in a case where the temperature abnormality is detected in the monitoring of the temperature.

According to still another aspect of the present invention, a temperature monitoring method in a communication apparatus includes:

communicating, by a communication unit, with an additional apparatus;

monitoring a temperature of the communication apparatus to detect presence or absence of a temperature abnormality; and stopping or decreasing communication of the communication unit in a case where the temperature abnormality is detected in the monitoring of the temperature.

Effects of the Invention

The present invention can eliminate the temperature abnormality caused in the communication apparatus.

DESCRIPTION OF EMBODIMENTS

Hereinafter, embodiments of the present invention will be described in detail with reference to the drawings. Hereinafter, a case where a communication apparatus is an ONU in a PON system will be described as an example.

First Embodiment

Figure 1:
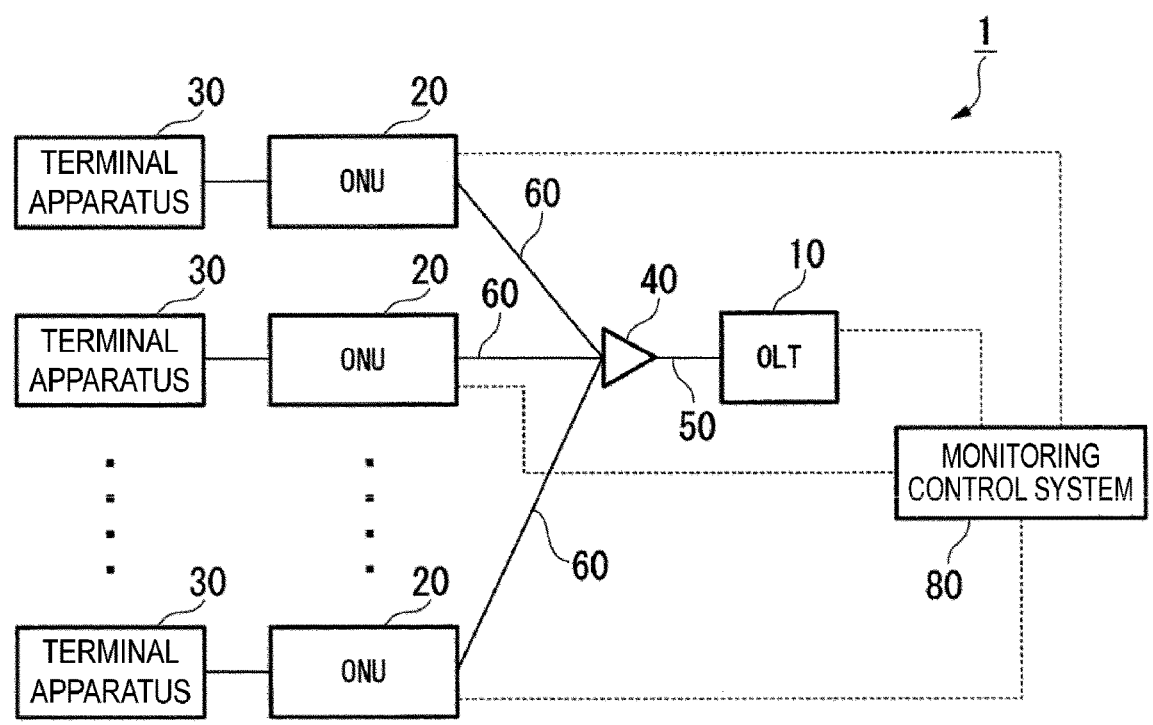
FIG. 1 is a diagram illustrating a configuration of a communication system according to a first embodiment of the present invention.

FIG. 1 is a diagram illustrating a configuration example of a communication system 1 according to the first embodiment. The communication system 1 is, for example, a PON system. The communication system 1 includes an OLT 10 and a plurality of ONUs 20. For example, the OLT 10 is installed in an exchange building, and the ONUs 20 are installed in houses of users. The ONUs 20 are connected to terminal apparatuses 30 of the users. In FIG. 1, one terminal apparatus 30 is connected to each of the ONUs 20, but any number of terminal apparatuses 30 may be connected to each of the ONUs 20. The terminal apparatus 30 is, for example, a personal computer (PC) or a home gateway (HGW).

An optical splitter 40 is connected to the OLT 10 via a transmission line 50, and is connected to each of the ONUs 20 via a transmission line 60. The transmission line 50 and the transmission line 60 are, for example, optical fibers. A monitoring control system 80 is connected to the OLT 10 and the ONUs 20. The monitoring control system 80 monitors and controls the communication system 1. The monitoring control system 80 or a remote control terminal (not illustrated) can be remotely connected to the OLT 10 and the ONUs 20 and control the OLT 10 and the ONUs 20. Note that, the monitoring control system 80 may be remotely connected to the ONUs 20 via the OLT 10.

The OLT 10 multiplexes downlink optical signals to be transmitted to a plurality of the ONUs 20 and outputs the signals to the transmission line 50. The optical splitter 40 distributes and transmits, to the plurality of transmission lines 60, the downlink signals that have been transmitted through the transmission line 50. Each of the ONUs 20 receives the downlink signal that is transmitted through the transmission line 60, converts the received signal into an electrical signal, and outputs the electrical signal to the terminal apparatus 30. Furthermore, each of the ONUs 20 receives an uplink signal from the terminal apparatus 30, converts the received uplink signal from the electrical signal into an optical signal, and outputs the optical signal to the transmission line 60. The optical splitter 40 multiplexes the uplink signal that is transmitted through each of the plurality of transmission lines 60 connected with the corresponding ONU 20, and outputs the multiplexed signal to the transmission line 50. The OLT 10 receives, from the transmission line 50, the signal obtained by multiplexing the uplink signal transmitted from each of the ONUs 20. Note that, the OLT 10 allocates, to each of the ONUs 20, a band for transmitting the uplink signal. The ONU 20 transmits the uplink signal by using the band allocated by the OLT 10.

Figure 2:
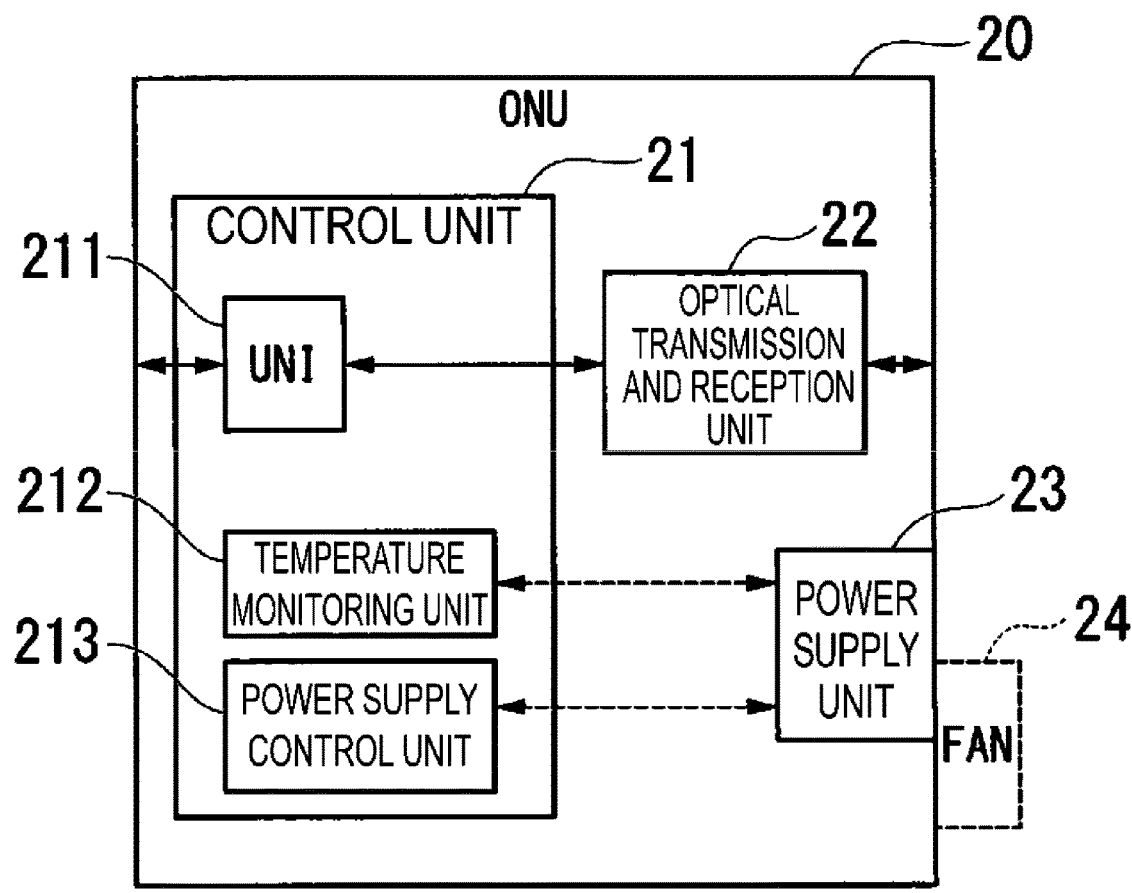
FIG. 2 is a diagram illustrating a configuration of an ONU according to the first embodiment.

FIG. 2 is a diagram illustrating a configuration example of the ONU 20. In FIG. 2, only functional blocks related to the present embodiment are extracted and illustrated. The ONU 20 is, for example, a 10G-EPON optical line terminal. The ONU 20 includes a control unit 21, an optical transmission and reception unit 22, and a power supply unit 23. The ONU 20 may or may not include a cooler (FAN) 24 that cools components in the ONU 20. In the present embodiment, the ONU 20 not including the FAN 24 will be described. The solid arrows in FIG. 2 represent communication signals, and dashed arrows represent control signals.

The control unit 21 controls each unit of the ONU 20. The control unit 21 includes a user/network interface (UNI) 211, a temperature monitoring unit 212, and a power supply control unit 213. Note that, the temperature monitoring unit 212 may be provided inside or outside the control unit 21. The UNI 211 has the same function as that of the UNI 902 illustrated in FIG. 11. The UNI 211 transmits and receives data to and from the terminal apparatus 30.

The temperature monitoring unit 212 and the power supply control unit 213 are in a state in which the power is constantly supplied by the power supply unit 23. Note that, "power interruption" is referred to as stop of the power supply from the power supply unit 23. Stop of the power supply from the power supply unit 23 to all components except the temperature monitoring unit 212 and the power supply control unit 213 or predetermined components except the temperature monitoring unit 212 and the power supply control unit 213 among these components of the ONU 20 is referred to as "power off".

The temperature monitoring unit 212 constantly acquires temperature information of the inside of the ONU 20. In a case where a component mounted in the ONU 20 (hereinafter, referred to as mounted component) generates heat, the temperature monitoring unit 212 detects that the mounted component is high in temperature when acquired temperature information satisfies a predetermined detection condition. For example, one or more temperature sensors are installed in the ONU 20. The temperature monitoring unit 212 acquires temperature information indicating a measurement value of the temperature obtained by each of the temperature sensors. The temperature monitoring unit 212 detects that any mounted component is high in temperature by comparing the temperature measured by the temperature sensor with a threshold value. In a case where the temperature sensors are installed at a plurality of different places in the ONU 20, the temperature monitoring unit 212 can determine an approximate position of the mounted component which is high in temperature based on a position of each of the temperature sensors and a temperature measured by each temperature sensor. Furthermore, by attaching the temperature sensor to each of the mounted components, the temperature monitoring unit 212 can identify which mounted component is high in temperature. Hereinafter, the mounted component which is high in temperature is referred to as a heat generating component.

In a case where the temperature monitoring unit 212 detects a temperature abnormality, the power supply control unit 213 performs power supply stop processing of performing control so as to stop power supply from the power supply unit 23 to the heat generating component. The power supply control unit 213 performs power off as the power supply stop processing. In the power off processing, power interruption is performed on a majority of the components except the temperature monitoring unit 212 and the power supply control unit 213. Thus, even in a case where the heat generating component cannot be identified, power supply to the mounted components including the heat generating component can be stopped. Furthermore, in a case where an approximate position of the heat generating component can be identified, the power supply control unit 213 may perform, as the power supply stop processing, control so as to stop the power supply to the mounted components at and around the approximate position of the heat generating component. Furthermore, in a case where the heat generating component can be identified, the power supply control unit 213 may perform, as the power supply stop processing, control so as to stop only the power supply to the heat generating component. Hereinafter, the stop of the power supply to the mounted components at and around the approximate position of the heat generating component, or the stop of only the power supply to the heat generating component is referred to as "specific component power down".

Furthermore, after stopping the power supply to the heat generating component through the power supply stop processing, the power supply control unit 213 performs automatic power on of the heat generating component when the temperature monitoring unit 212 detects that a temperature state in the ONU 20 is sufficiently decreased. The automatic power on means performing power supply restart processing of restarting the power supply to the mounted component to which the power is stopped to be supplied through the power supply stop processing and instructing restart of the ONU 20. Through the automatic power on, the power supply control unit 213 automatically restarts the power supply to the heat generating component from the power supply unit 23. Furthermore, by restarting the ONU 20, initial setting processing for communication between the ONU 20 and the OLT 10 is performed.

Note that, the power supply control unit 213 determines whether or not to perform the power supply restart processing in accordance with a preset condition. For example, even in a case where the heat generated by the mounted components is repeatedly detected, the power supply control unit 213 automatically performs the power supply restart processing when the number of times of the detection is less than the predetermined number of times. However, in a case where the number of times of the detection is equal to or greater than the predetermined number of times, the power supply control unit 213 does not automatically perform the power supply restart processing because it seems necessary to improve an installation environment. In this case, a power supply operator checks the ONU 20 and then manually restarts the power supply unit 23, thereby restarting the power supply.

Figure 11:
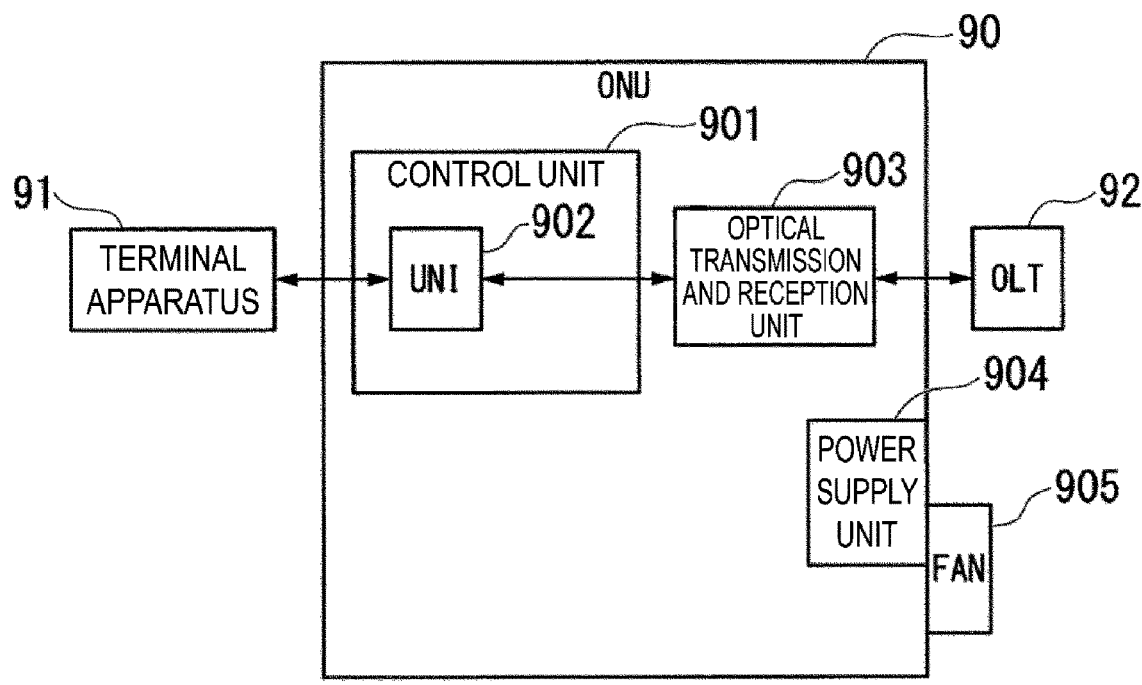
FIG. 11 is a diagram illustrating a configuration of an ONU of the related art.

The optical transmission and reception unit 22 has the same function as that of the optical transmission and reception unit 903 illustrated in FIG. 11. The optical transmission and reception unit 22 converts an uplink electrical signal input from the UNI 211 into an optical signal to output the optical signal to the OLT 10, and converts a downlink optical signal input from the OLT 10 into an electrical signal to output the electrical signal to the UNI 211. The optical transmission and reception unit 22 transmits an uplink signal by using the band allocated by the OLT 10. The power supply unit 23 supplies power received from a power source by using an AC adapter to each of the mounted components of the ONU 20. The power supply unit 23 also supplies power to mounted components not illustrated in FIG. 2.

Figure 3:
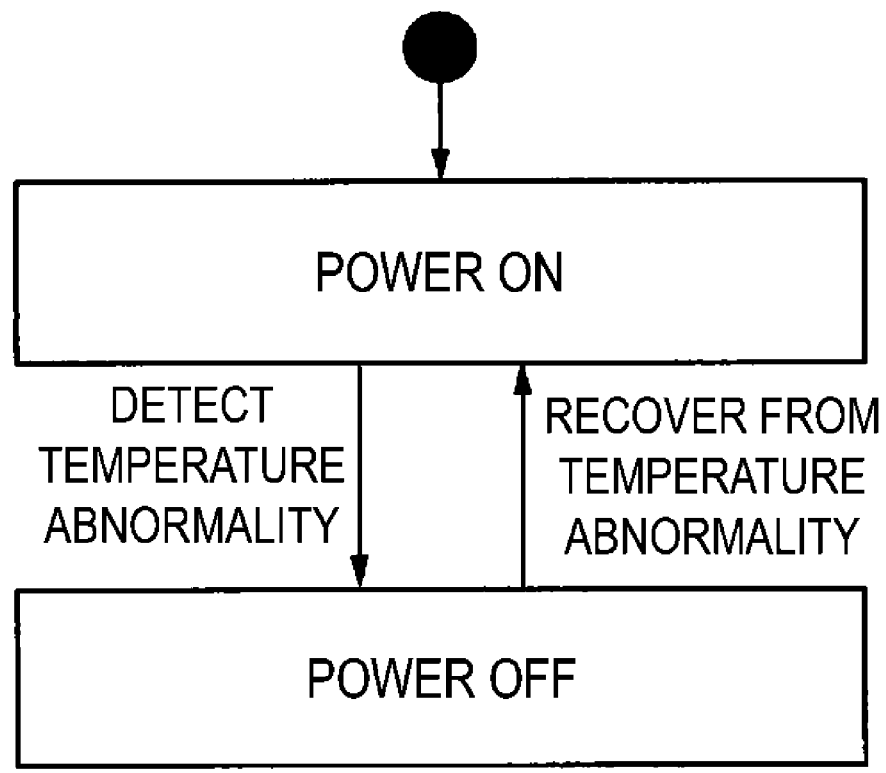
FIG. 3 is a diagram illustrating an operation outline of the ONU according to the first embodiment.

FIG. 3 is a diagram illustrating an operation outline of the ONU 20. FIG. 3 illustrates, as an example, a case where the power off is performed as the power supply stop processing. The power supply control unit 213 of the ONU 20 performs power on processing when the power is first supplied from the power supply unit 23. In a case where temperature monitoring is enabled, the power supply control unit 213 performs power off processing when detecting a temperature abnormality due to an increase in temperature of the mounted component. When it is determined that the temperature of the ONU 20 is decreased and that recovery from the temperature abnormality state is made, the power supply control unit 213 performs the power on processing.

In this manner, in a case where the ONU 20 in operation is determined to be in a temperature abnormality state, a cause of the heat generation is eliminated by automatically stopping the power supply from the power supply unit 23. After the temperature monitoring unit 212 determines that the temperature of the heat generating component is sufficiently decreased, the power supply control unit 213 autonomously recovers the power supply from the power supply unit 23. Furthermore, the power supply control unit 213 counts the number of times that the power supply is automatically recovered, and in a case where the number of times exceeds the predetermined upper limit, the power supply control unit 213 does not recover the power supply.

Figure 4:
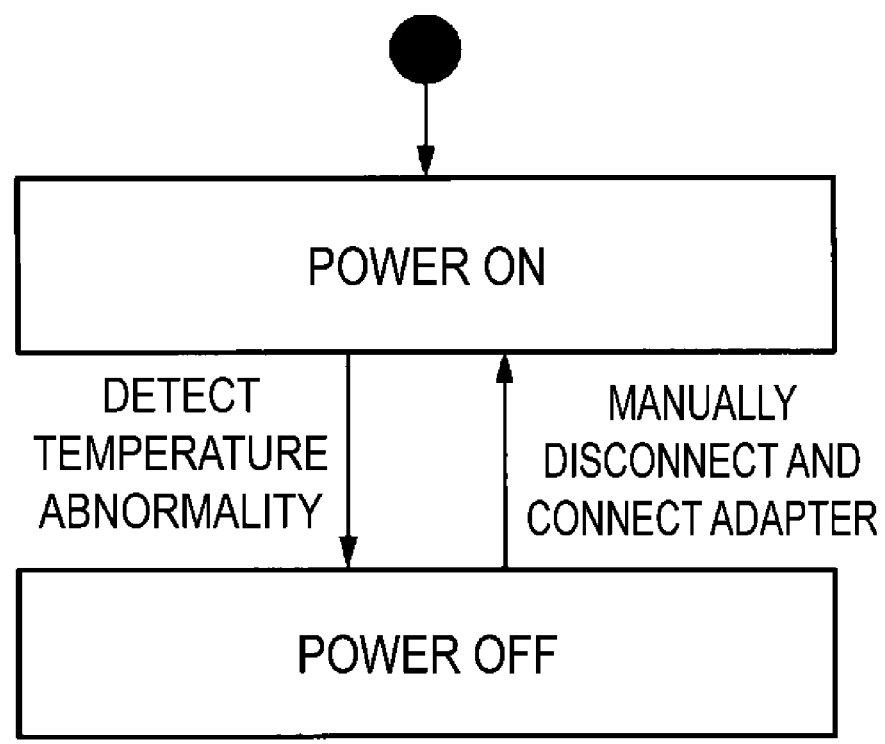
FIG. 4 is a diagram illustrating an operation outline of the ONU according to the first embodiment.

In the operation illustrated in FIG. 3, the ONU 20 automatically recovers after detecting the temperature abnormality and thus performing the power off. FIG. 4 is a diagram illustrating an operation outline of the ONU 20 in a case where the power supply does not automatically recover after the power off due to the detection of the temperature abnormality. As in FIG. 3, the ONU 20 performs the power on processing when the power is first supplied. The power supply control unit 213 performs the power off processing when a temperature abnormality is detected due to an increase in temperature of the mounted component. After the power off, the user or a maintenance worker manually disconnects and connects the AC adapter of the power supply unit 23 after checking the state of the ONU 20 and improving an environment in which the ONU 20 is high in temperature. Thus, the power supply unit 23 is powered on, and the ONU 20 is restarted.

In FIGS. 3 and 4, the specific component power down may be performed instead of the power off. As described above, in a case where the ONU in use is determined to be in the temperature abnormality state, the power off or the specific component power down is automatically performed on the ONU, so that the ONU is disabled. This prevents the temperature of the ONU installed in the house of the user from becoming excessively high and enables the user to safely use the ONU. Furthermore, an effect of promoting improvement in the installation environment of the ONU can also be expected.

Note that, after repeating the transition of the power supply state illustrated in FIG. 3 a predetermined number of times, the ONU 20 may make a transition of the power supply state illustrated in FIG. 4.

Figure 5:
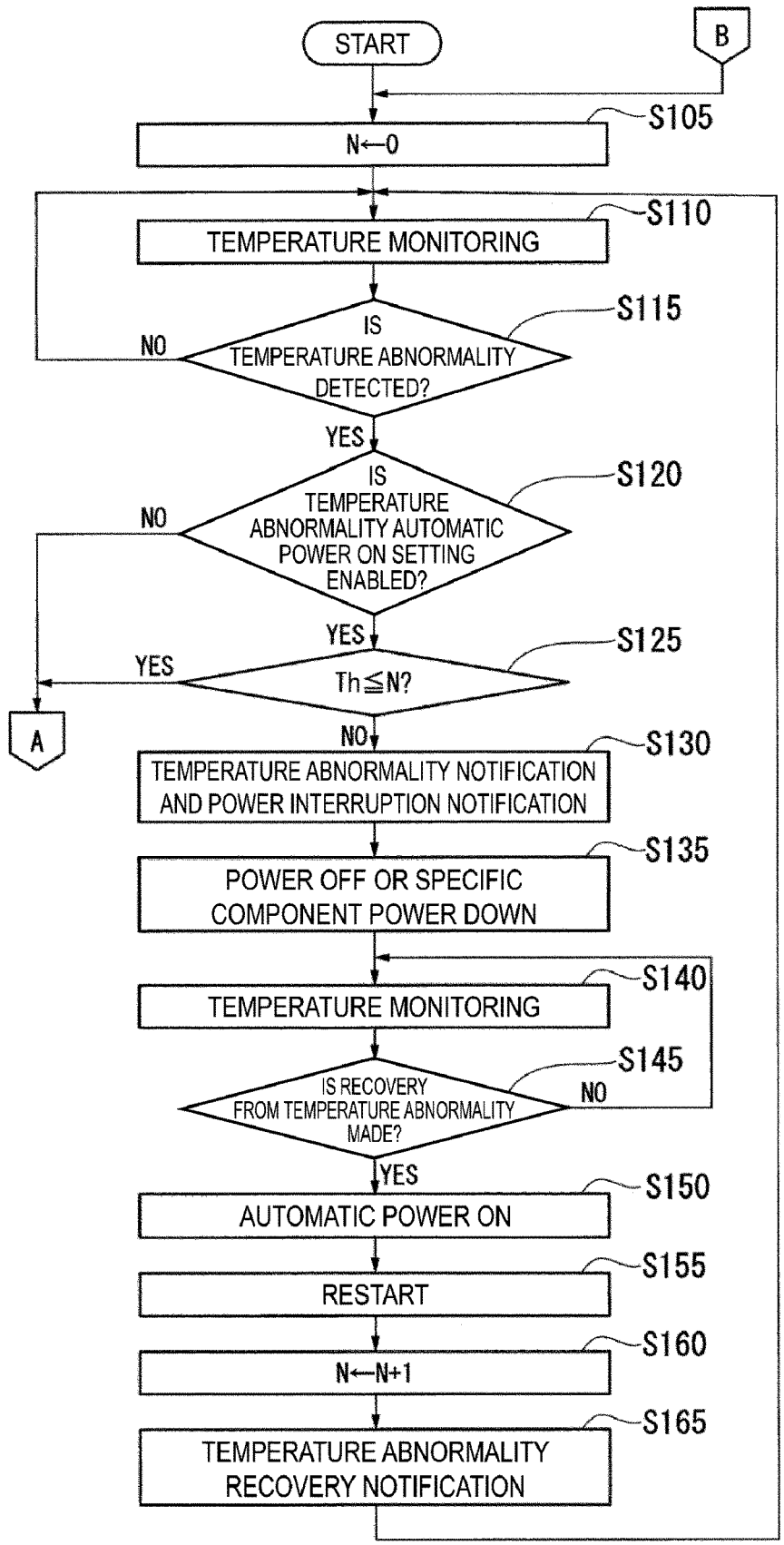
FIG. 5 is a flowchart illustrating an operation of the ONU according to the first embodiment.
Figure 6:
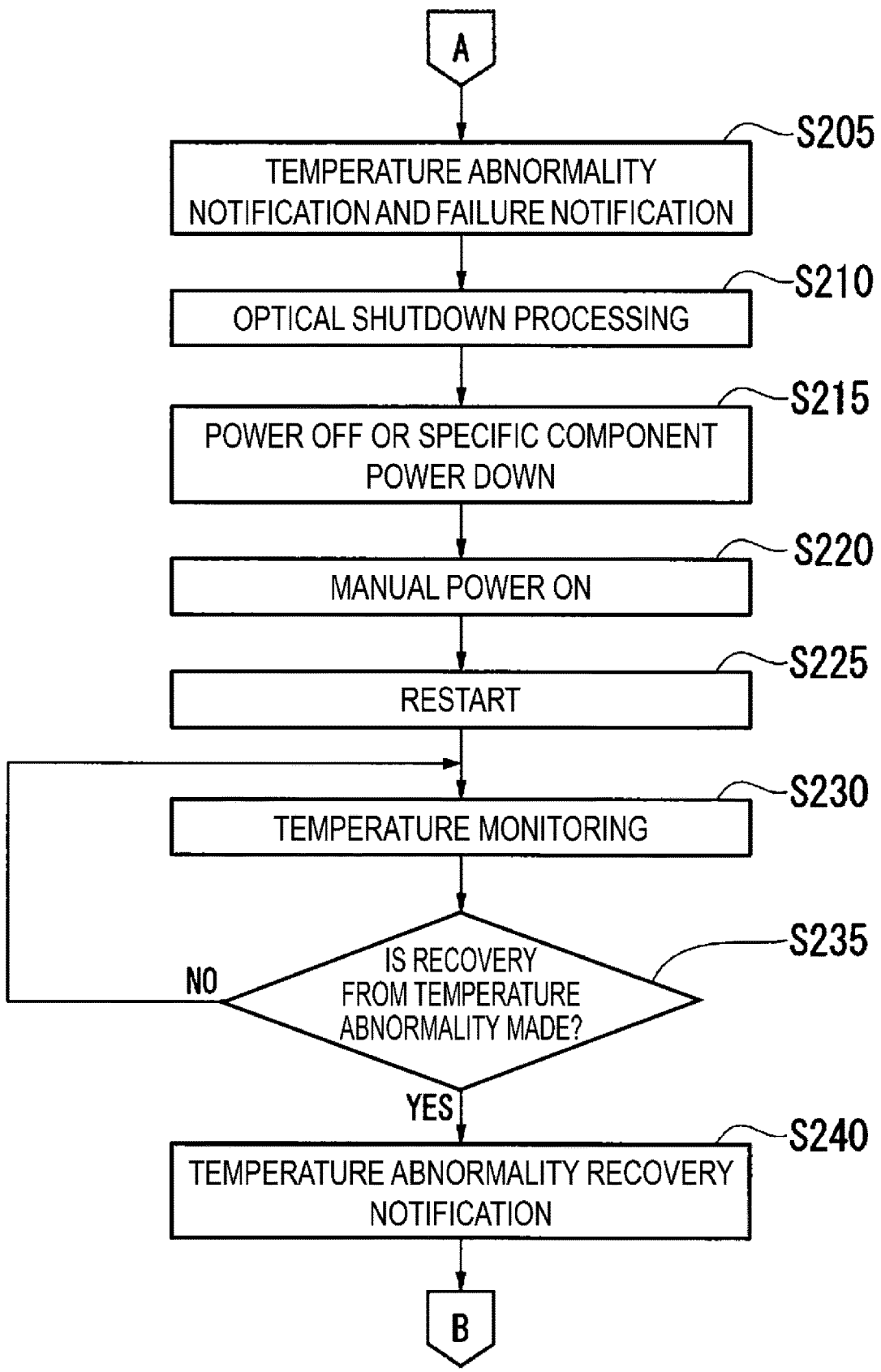
FIG. 6 is a flowchart illustrating an operation of the ONU according to the first embodiment.

FIGS. 5 and 6 are flowcharts illustrating the operation the ONU 20. With reference to these flowcharts, an operation will be described in which the ONU 20 autonomously performs temperature monitoring on the heat generating component and takes a countermeasure against a temperature increase by performing the power down of the heat generating component.

The power supply control unit 213 stores information regarding whether a temperature abnormality automatic power on setting is enabled or disabled in advance. "Enabling of the temperature abnormality automatic power on setting" indicates that the temperature abnormality automatic power on is performed, and "disabling of the temperature abnormality automatic power on setting" indicates that the temperature abnormality automatic power on is not performed. The "temperature abnormality automatic power on" means that after a temperature abnormality is detected in the ONU 20, and the power supply control unit 213 automatically performs the power off or the specific component power down, the automatic power on is performed in a case where recovery from the temperature abnormality is made. The power supply control unit 213 further stores a setting value Th. The setting value Th represents the number of times that the temperature abnormality automatic power on is allowed. Note that, the temperature abnormality automatic power on setting and the setting value Th can be set in the ONU 20 by using the monitoring control system 80 and a terminal for maintenance.

The power supply control unit 213 sets a counter value N to an initial value of zero (Step S105). The counter value N indicates the number of times that the temperature abnormality automatic power on is performed. The temperature monitoring unit 212 monitors the temperature inside the apparatus (Step S110). The temperature monitoring unit 212 determines whether or not a temperature abnormality is detected through the monitoring (Step 115). In a case where the temperature monitoring unit 212 determines that the temperature abnormality is not detected (Step S115: NO), the processing in Step S110 is repeated. In a case where it is determined that a temperature abnormality is detected (Step S115: YES), the temperature monitoring unit 212 notifies the power supply control unit 213 of the temperature abnormality.

When receiving a notification indicating the temperature abnormality from the temperature monitoring unit 212, the power supply control unit 213 determines whether or not the temperature abnormality automatic power on setting is enabled (Step S120). In a case where the power supply control unit 213 determines that the temperature abnormality automatic power on setting is enabled (Step S120: YES), the power supply control unit 213 determines whether or not the counter value N is equal to or greater than the setting value Th (Step 135). In a case where the power supply control unit 213 determines that the counter value N is not equal to or greater than the setting value Th (Step S125: NO), the processing in Step S130 is performed.

The power supply control unit 213 outputs a temperature abnormality notification and a power interruption notification to an external apparatus a predetermined number of times (Step S130). The external apparatus is, for example, the monitoring control system 80, but may be the OLT 10. The power supply control unit 213 performs the power off or the specific component power down (Step S135). Components to which power is stopped to be supplied through the specific component power down include the heat generating component. A light emitting diode (LED) lamp (not illustrated) included in the ONU 20 is turned off due to the stop of the power supply.

After Step S135, the temperature monitoring unit 212 monitors the temperature inside the apparatus (Step S140). The temperature monitoring unit 212 determines whether or not recovery from the temperature abnormality is made through the monitoring (Step S145). In a case where the temperature monitoring unit 212 determines that recovery from the temperature abnormality is not made (Step S145: NO), the processing in Step S140 is repeated. In a case where it is determined that recovery from the temperature abnormality is made (Step S145: YES), the temperature monitoring unit 212 notifies the power supply control unit 213 of the recovery from the temperature abnormality.

When receiving the notification indicating the recovery from the temperature abnormality, the power supply control unit 213 starts the automatic power on (Step S150). The power supply control unit 213 restarts the power supply from the power supply unit 23 to the component to which the power is stopped to be supplied. When the power supply to each component is restarted, the control unit 21 restarts the ONU 20 (Step S155). The power supply control unit 213 increments the counter value N by one (Step S160). The power supply control unit 213 transmits the temperature abnormality recovery notification to the external apparatus a predetermined number of times (Step S165). The control unit 21 returns to the processing in Step S110.

In a case where it is determined that the temperature abnormality automatic power on setting is disabled in Step S120 (Step S120: NO), or in a case where it is determined that the counter value N is equal to or greater than the setting value Th in Step S125 (Step S125: YES), the power supply control unit 213 performs processing in Step S205 in FIG. 6. The power supply control unit 213 outputs a temperature abnormality notification and a failure notification to the external apparatus a predetermined number of times (Step S205). The power supply control unit 213 performs optical shutdown processing of the optical transmission and reception unit 22 (Step S210).

Next, the power supply control unit 213 performs the power off or the specific component power down (Step S215). Components to which power is stopped to be supplied through the specific component power down include the heat generating component. The LED lamp (not illustrated) included in the ONU 20 is turned off due to the stop of the power supply. Note that, the power interruption notification cannot be performed because the optical shutdown has already been performed.

The maintenance worker or the user manually turns on the power supply unit 23 of the ONU 20 by disconnecting and connecting the AC adapter of the ONU 20 (Step S220). After the manual power on, the control unit 21 restarts the ONU 20 (Step S225). After the restart of the ONU 20, the power supply control unit 213 recovers from the power interruption to each component, and supplies the power from the power supply unit 23 to each component.

After Step S225, the temperature monitoring unit 212 monitors the temperature inside the apparatus (Step S230). The temperature monitoring unit 212 determines whether or not recovery from the temperature abnormality is made by the monitoring (Step 235). In a case where the temperature monitoring unit 212 determines that recovery from the temperature abnormality is not made (Step S235: NO), the processing in Step S230 is repeated. In a case where it is determined that recovery from the temperature abnormality is made (Step S235: YES), the temperature monitoring unit 212 transmits a temperature abnormality recovery notification to the external apparatus a predetermined number of times (Step S240). The control unit 21 performs processing from Step S105 in FIG. 5.

Figure 7:
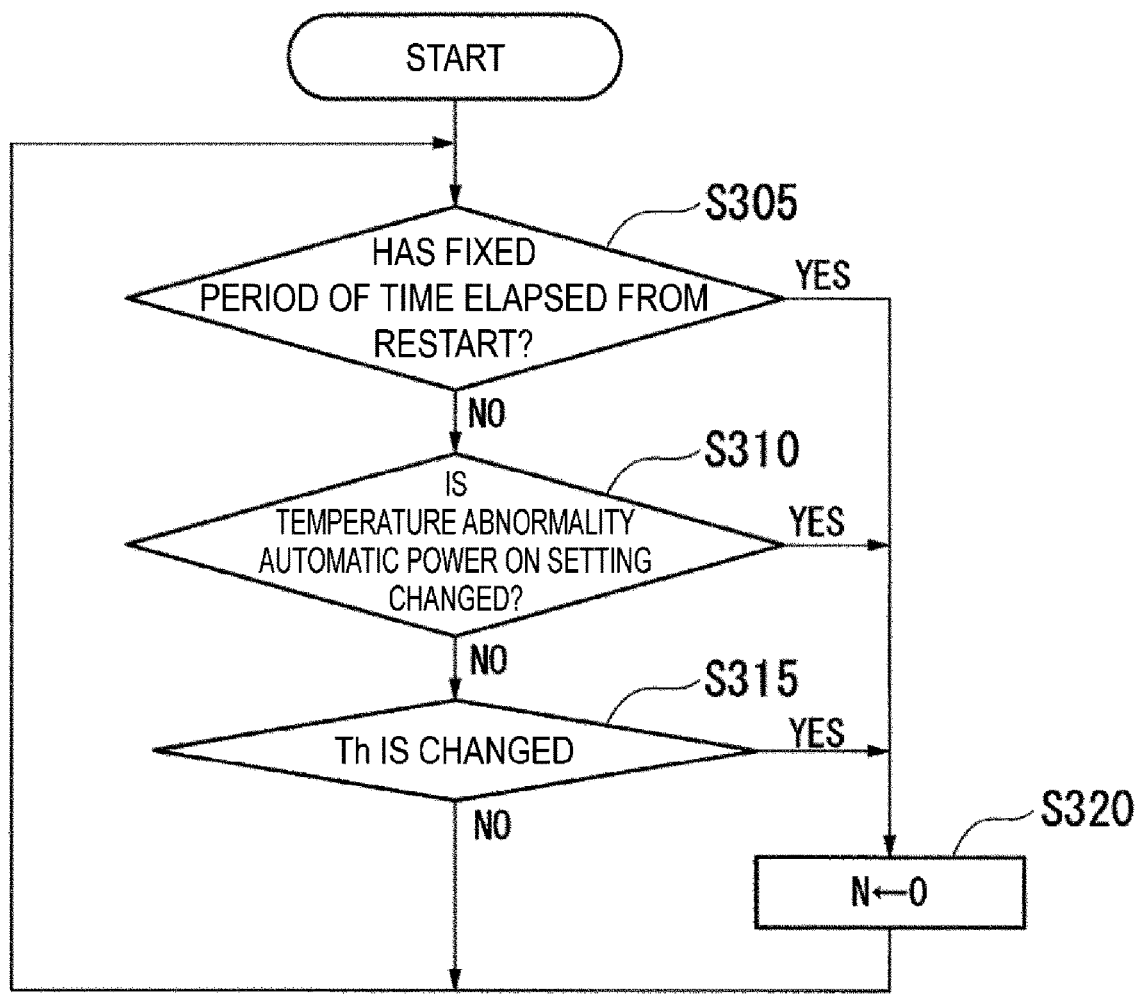
FIG. 7 is a flowchart illustrating an operation of the ONU according to the first embodiment.

FIG. 7 is a flowchart illustrating reset processing of the counter value N in the power supply control unit 213. The power supply control unit 213 performs the processing illustrated in FIG. 7 in Step S110 of FIG. 5. The power supply control unit 213 determines whether or not a fixed period of time has elapsed since the restart (Step S305). In a case where it is determined that the fixed period of time has not elapsed since the restart (Step S305: NO), the power supply control unit 213 determines whether or not the temperature abnormality automatic power on setting is changed (Step S310). In a case where it is determined that the temperature abnormality automatic power on setting is not changed (Step S310: NO), the power supply control unit 213 determines whether or not the setting value Th is changed (Step S315). In a case where the power supply control unit 213 determines that the setting value Th is changed (Step S315: NO), the processing from Step S305 is repeated.

In a case where it is determined that the fixed period of time has elapsed since the restart (Step S305: YES), in a case where it is determined that the temperature abnormality automatic power on setting is changed (Step S310: YES), or in a case where it is determined that the setting value Th is changed (Step S315: YES), the power supply control unit 213 performs the processing in Step S320. In other words, the power supply control unit 213 sets the counter value N to zero, and repeats the processing from Step S305.

In the related art, in a case where the ONU is high in temperature, the heat generating component and the housing are cooled by the FAN or the like from the outside. However, in a case where the ONU is still high in temperature, the user or the maintenance worker performs the power off or the like with the power abnormality as a trigger. The ONU of the present embodiment eliminates a cause of the heat generation by stopping the power supply to the heat generating component in accordance with a condition, and autonomously recovers the power supply after the temperature of the heat generating component is sufficiently decreased. Furthermore, the ONU performs control of repeating autonomous recovery from the temperature abnormality state the set number of times, and requiring the manual power on without the autonomous recovery in a case where the number of times of the autonomous recovery exceeds the set number of times.

According to the present embodiment, without the need of a cooling mechanism such as the FAN and an increase in size of the housing, a countermeasure against the temperature increase of the ONU can be achieved. Furthermore, the ONU can be restarted when the temperature is decreased without use of one-time countermeasure such as a thermal fuse. Furthermore, the ONU can avoid a risk that may occur due to a high temperature in the case of a temperature abnormality for a fixed period of time. Furthermore, since the ONU operates autonomously without troubling the maintenance worker, the maintenance operation can be reduced. On the other hand, in an environment in which the temperature abnormality occurs repeatedly, safety of the ONU needs to be manually checked without the restart, which results in improvement of safety.

As a premise, the ONU of the present embodiment is an apparatus that is normally not high in temperature. However, even in a case where it is assumed that the temperature is high when an abnormality occurs due to a use environment or the like, safety measures can be taken by using an inexpensive configuration without the FAN. Note that, the present embodiment does not actively eliminates a configuration in which the ONU includes a cooling device such as the FAN.

Second Embodiment

In the first embodiment, since the ONU stops the power supply to the mounted component in a case where the temperature abnormality is detected even during communication, the communication is interrupted. In the present embodiment, by decreasing a communication rate, a load of the processing is reduced while the communication is maintained, and a heat generation amount of the ONU is decreased. The communication system of the present embodiment has the same configuration as that of the communication system 1 in the first embodiment illustrated in FIG. 1. However, instead of the ONU 20 illustrated in FIG. 2, the communication system of the present embodiment includes an ONU 20a illustrated in FIG. 9 to be described later.

Figure 8:
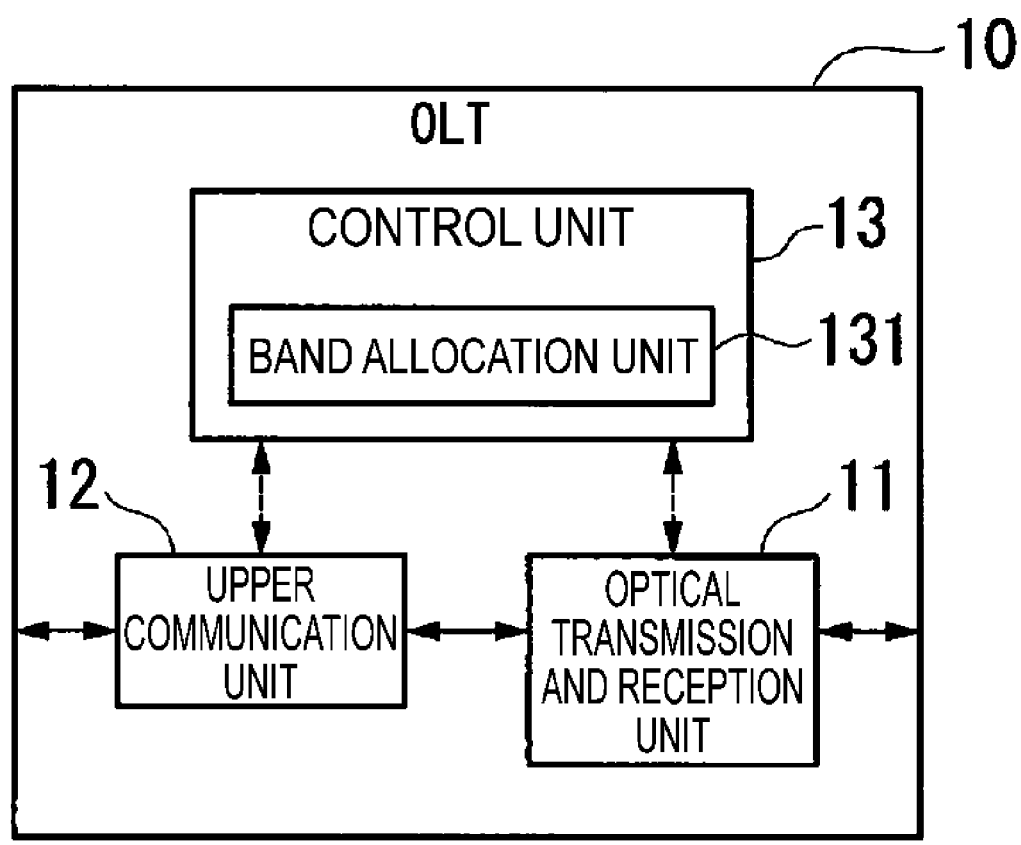
FIG. 8 is a diagram illustrating a configuration of an OLT according to a second embodiment.

FIG. 8 is a diagram illustrating a configuration example of the OLT 10. In FIG. 8, only functional blocks related to the present embodiment are extracted and illustrated. The OLT 10 includes an optical transmission and reception unit 11, an upper communication unit 12, and a control unit 13.

The optical transmission and reception unit 11 converts an uplink optical signal received from the ONU 20a into an electrical signal and outputs the electrical signal to the upper communication unit 12. Furthermore, the optical transmission and reception unit 11 converts a downlink electrical signal input from the upper communication unit 12 into an optical signal and outputs the optical signal to the ONU 20a. The upper communication unit 12 transmits and receives data to and from an upper network. The upper communication unit 12 outputs the uplink electrical signal output by the optical transmission and reception unit 11 to the upper network, and outputs the downlink electrical signal received from the upper network to the optical transmission and reception unit 11.

The control unit 13 controls each unit. The control unit 13 includes a band allocation unit 131. The band allocation unit 131 allocates a band to each ONU 20a. The control unit 13 notifies the ONU 20a of the allocated band by using the optical signal transmitted from the optical transmission and reception unit 11.

Figure 9:
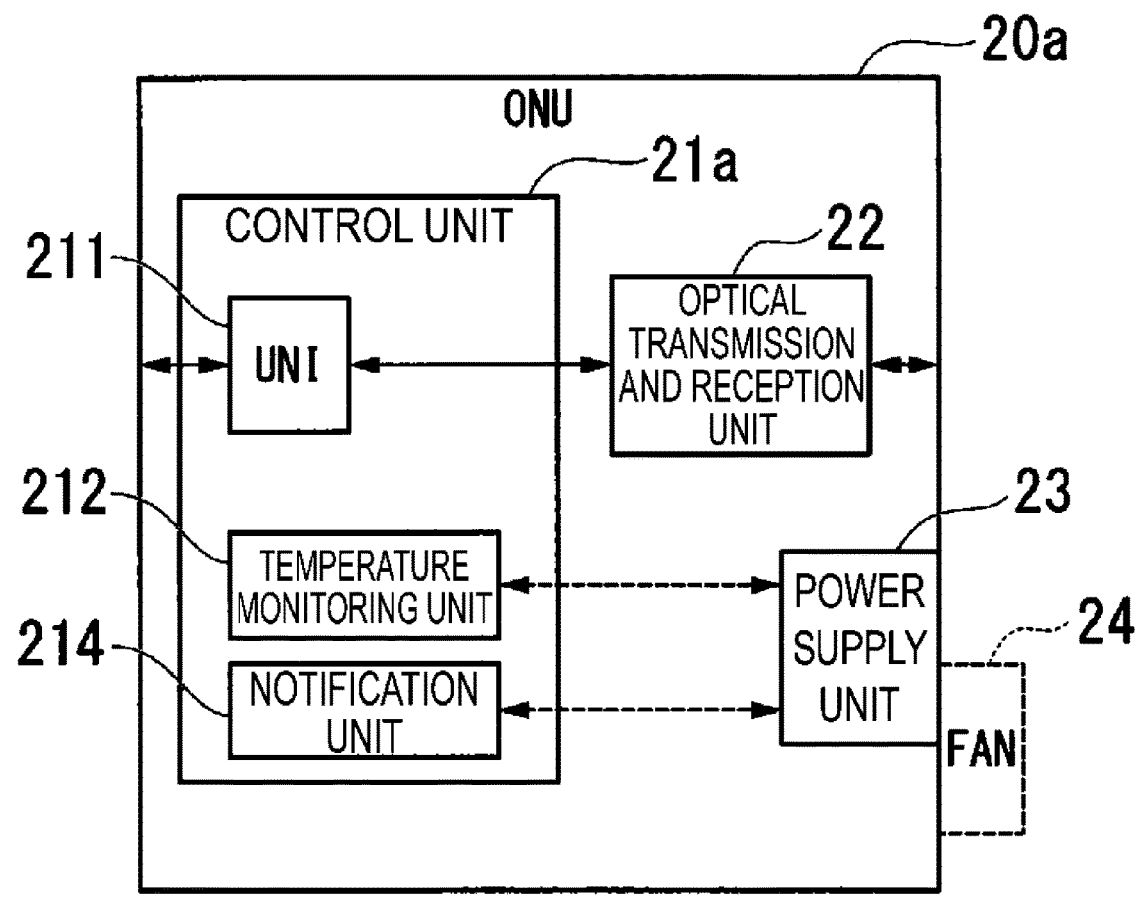
FIG. 9 is a diagram illustrating a configuration of an ONU according to the second embodiment.

FIG. 9 is a diagram illustrating a configuration example of the ONU 20a. In the ONU 20a illustrated in FIG. 9, the same portions as those of the ONU 20 according to the first embodiment illustrated in FIG. 2 are denoted by the same reference numerals, and description thereof will be omitted. The ONU 20a illustrated in FIG. 9 is different from the ONU 20 illustrated in FIG. 2 in that a control unit 21a is provided instead of the control unit 21. The control unit 21a is different from the control unit 21 in that a notification unit 214 is provided instead of the power supply control unit 213. In a case where the temperature monitoring unit 212 detects a temperature abnormality, the control unit 21a stops or decreases communication with the terminal apparatus 30 through the UNI 211 and communication with the OLT 10 through the optical transmission and reception unit 22. In a case where the temperature monitoring unit 212 detects that the mounted component is high in temperature, the notification unit 214 notifies the OLT 10 of the detection of the temperature abnormality.

Furthermore, the communication of the ONU 20a can be decreased as follows. In a case where the temperature abnormality is detected, the temperature monitoring unit 212 of the ONU 20a notifies the notification unit 214 of the detected temperature abnormality. The notification unit 214 transmits the temperature abnormality notification from the optical transmission and reception unit 22 using the uplink signal. The optical transmission and reception unit 11 of the OLT 10 outputs the received temperature abnormality notification to the control unit 13. The band allocation unit 131 of the control unit 13 does not allocate a band to the ONU 20a that is the transmission source of the temperature abnormality notification for a certain period of time, or decreases a period of time during which the band is allocated. In this manner, the control unit 21a of the ONU 20a performs control of stopping or decreasing the transmission of uplink communication from the optical transmission and reception unit 22 for a certain period of time. Furthermore, the control unit 13 of the OLT 10 may stop the downlink signal to the ONU 20a that is the transmission source of the temperature abnormality notification or decimate and transmit the signal. In this case, the control unit 13 may discard the downlink signal, or may transmit the downlink signal after buffering the downlink signal for a predetermined period of time.

According to the present embodiment, it is possible to eliminate the temperature abnormality of the ONU while continuing the communication. Note that, the control unit 21a of the ONU 20a may control the power supply unit 23 so as to perform the power off in a case where recovery from the temperature abnormality is not made for a predetermined period of time or in a case where the temperature abnormality and the recovery from the temperature abnormality are repeated a predetermined number of times.

Note that the above description has been made using the ONU as an example, but a communication apparatus may be other than the ONU.

Figure 10:
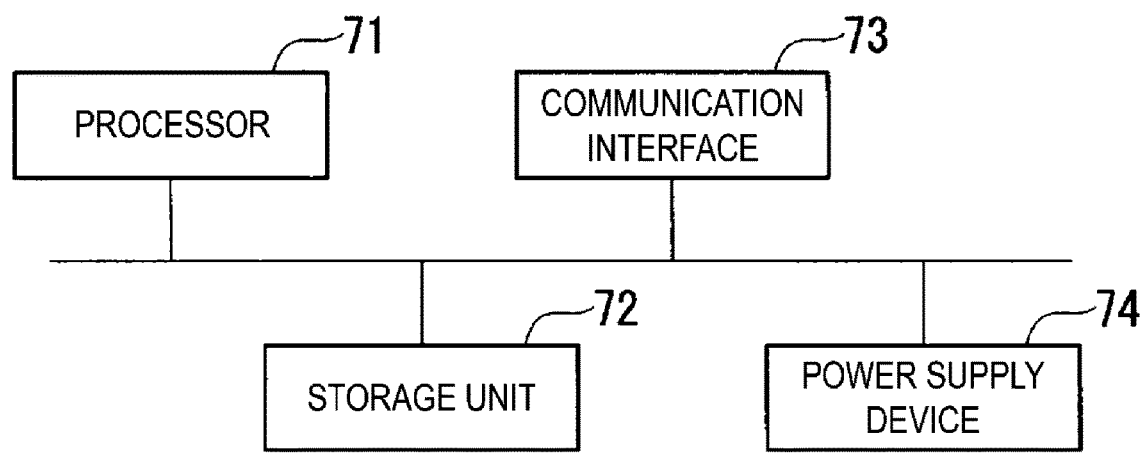
FIG. 10 is a diagram illustrating a hardware configuration example of the ONU according to each of the first embodiment and the second embodiment.

Next, a hardware configuration example in a case where the ONU 20 and the ONU 20a perform software processing will be described. FIG. 10 is a diagram illustrating the hardware configuration example of the ONU 20. The ONU 20 includes a processor 71, a storage unit 72, a communication interface 73, and a power supply device 74. The processor 71 is a central processing device that performs operation and control. The processor 71 is, for example, a central processing unit (CPU). The storage unit 72 is a computer-readable recording medium. Examples of the storage unit 72 include various kinds of memories, and storage devices. The storage unit 72 stores programs for executing processing of the control unit 21. The processor 71 implements a function of the control unit 21 including the temperature monitoring unit 212 and the power supply control unit 213 by reading the program from the storage unit 72 and executing the program. The storage unit 72 includes a work area when the processor 71 executes various programs. All or some of functions of the control unit 21 may be implemented by using hardware such as an application specific integrated circuit (ASIC), a programmable logic device (PLD), or a field programmable gate array (FPGA). The communication interface 73 performs communication with an additional apparatus. The communication interface 73 corresponds to the UNI 211 and the optical transmission and reception unit 22. The power supply device 74 supplies power received from the power source to the processor 71, the storage unit 72, and the communication interface 73. The power supply device 74 corresponds to the power supply unit 23.

The hardware configuration of the ONU 20a is the same as that of the hardware configuration of the ONU 20 illustrated in FIG. 10. In a case of the ONU 20a, the storage unit 72 stores the program for executing the processing of the control unit 21a. The processor 71 implements a function of the control unit 21a including the temperature monitoring unit 212 and the notification unit 214 by reading the program from the storage unit 72 and executing the program.

Note that, the hardware configuration of the OLT 10 is the same as that of the hardware configuration of the ONU 20 illustrated in FIG. 10. In a case of the OLT 10, the storage unit 72 stores the program for executing the processing of the control unit 13. The processor 71 implements a function of the control unit 13 including the band allocation unit 131 by reading the program from the storage unit 72 and executing the program. The communication interface 73 corresponds to the optical transmission and reception unit 11 and the upper communication unit 12.

According to the embodiment described above, the communication apparatus includes a communication unit, a power supply unit, a temperature monitoring unit, and a control unit. Examples of the communication apparatus include the ONU 20, and the ONU 20a of the embodiment. The communication unit communicates with an additional apparatus. Examples of the communication unit includes the UNI 211 and the optical transmission and reception unit 22 of the embodiment. The power supply unit supplies the power to the components mounted in the communication apparatus. The temperature monitoring unit monitors the temperature in the communication apparatus to detect the presence or absence of the temperature abnormality. In a case where the temperature monitoring unit detects a temperature abnormality, the control unit performs power supply stop processing of stopping the power supply from the power supply unit to at least some of the components in the communication apparatus. After the power supply stop processing, the control unit performs power supply restart processing of restarting the power supply to the component to which the power is stopped to be supplied through the power supply stop processing in a case where the temperature monitoring unit detects the recovery from the temperature abnormality. Note that, the control unit performs the power supply restart processing until the number of times of performing the power supply restart processing reaches a predetermined number of times, and in a case where the number of times of the power supply restart processing exceeds the predetermined number of times, the control unit does not perform the power supply restart processing.

Furthermore, the control unit may stop or decrease communication of the communication unit in a case where the temperature monitoring unit detects a temperature abnormality. The control unit may cause the communication unit to transmit a notification indicating the temperature abnormality in a case where the temperature monitoring unit detects the temperature abnormality, and may stop or decrease communication with the additional apparatus which receives the notification indicating the temperature abnormality. For example, the other apparatus that is a notification destination of the temperature abnormality is the OLT 10. Note that, in the embodiment described above, a case where the communication apparatus is the ONU, communication is performed using the electrical signal in the house, and communication is performed using the optical signal in the PON is described as an example, but the present invention is not limited to this. As another example, the communication apparatus may be a home gateway (HGW) in which communication is performed wirelessly in the house, and communication is performed using the optical signal in the PON.

Although embodiments of the present invention have been described above in detail with reference to the drawings, the specific configurations thereof are not limited to these embodiments and also include designs or the like without departing from the spirit of the present invention.

REFERENCE SIGNS LIST

1 Communication system
10 OLT
11 Optical transmission and reception unit
12 Upper communication unit
13 Control unit
20 ONU
20a ONU
21 Control unit
21a Control unit
22 Optical transmission and reception unit
23 Power supply unit
24 Cooler
30 Terminal apparatus
40 Optical splitter
50 Transmission line
60 Transmission line
71 Processor
72 Storage unit
73 Communication interface
74 Power supply device
80 Monitoring control system
90 ONU
91 Terminal apparatus
92 OLT
131 Band allocation unit
211 User/network interface
212 Temperature monitoring unit
213 Power supply control unit
214 Notification unit
901 Control unit
902 UNI
903 Optical transmission and reception unit
904 Power supply unit
905 Cooler

The invention claimed is:

1. A communication apparatus comprising:
a communication unit, implemented with one or more processors, configured to communicate with an additional apparatus;
a power supply unit configured to supply power to components mounted in the communication apparatus;
a temperature monitoring unit, implemented with one or more processors, configured to monitor a temperature of the communication apparatus to detect a presence or an absence of a temperature abnormality; and
a control unit, implemented with one or more processors, configured to:
perform power supply stop processing of stopping power supply from the power supply unit to one or more components in a case where the temperature monitoring unit detects the temperature abnormality;
determine whether a number of times automatically restoring the power supply to the one or more components is less than a predetermined number of times threshold;
in response to the number of times being less than the predetermined number of times threshold, automatically restore the power supply when detecting a recovery from the temperature abnormality; and
in response to the number of times being more than the predetermined number of times threshold, manually restore the power supply when detecting the recovery from the temperature abnormality.

2. The communication apparatus according to claim 1, wherein the control unit stops the power supply to at least one of the one or more components that has the temperature abnormality in the power supply stop processing.

3. A communication apparatus comprising:
a communication unit, implemented with one or more processors, configured to communicate with an additional apparatus;
a power supply unit configured to supply power to components mounted in the communication apparatus;
a temperature monitoring unit, implemented with one or more processors, configured to monitor a temperature of the communication apparatus to detect a presence or an absence of a temperature abnormality; and
a control unit, implemented with one or more processors, configured to stop using a band for communication of the communication unit or decrease a period of time using the band for the communication in a case where the temperature monitoring unit detects the temperature abnormality.

4. The communication apparatus according to claim 3, wherein the control unit is configured to cause the communication unit to transmit a notification indicating the temperature abnormality in a case where the temperature monitoring unit detects the temperature abnormality, and is configured to stop or decrease communication with the additional apparatus that receives the notification indicating the temperature abnormality.

5. A temperature monitoring method in a communication apparatus, the method comprising:
communicating, by a communication unit, with an additional apparatus;
monitoring a temperature of the communication apparatus to detect a presence or an absence of a temperature abnormality;
performing power supply stop processing of stopping power supply from a power supply unit to one or more components mounted in the communication apparatus in a case where the temperature abnormality is detected in the monitoring of the temperature, wherein the power supply unit is configured to supply power to the components mounted in the communication apparatus;

determining whether a number of times automatically restoring the power supply to the one or more components is less than a predetermined number of times threshold;

in response to the number of times being less than the predetermined number of times threshold, automatically restoring the power supply when detecting a recovery from the temperature abnormality; and in response to the number of times being more than the predetermined number of times threshold, manually restoring the power supply when detecting the recovery from the temperature abnormality.

* * * * *